(12) United States Patent
Jenkins et al.

(10) Patent No.: US 8,292,551 B2
(45) Date of Patent: Oct. 23, 2012

(54) SYSTEM, METHOD AND APPARATUS FOR REMOVING FAILED FASTENERS

(75) Inventors: William L. Jenkins, Burleson, TX (US); William B. Carr, Fort Worth, TX (US); Ernest L. Horter, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1160 days.

(21) Appl. No.: 12/113,228

(22) Filed: May 1, 2008

(65) Prior Publication Data
US 2009/0274526 A1  Nov. 5, 2009

(51) Int. Cl.
*B23B 49/02* (2006.01)
(52) U.S. Cl. ............... 408/115 R; 408/97; 408/115 B
(58) Field of Classification Search ............ 408/97, 408/115 R, 115 B, 72 B, 70, 84, 85, 86, 110, 408/709
See application file for complete search history.

(56) References Cited

U.S. PATENT DOCUMENTS

| | | | | |
|---|---|---|---|---|
| 252,704 A | * | 1/1882 | Southwick | 408/224 |
| 1,923,847 A | * | 8/1933 | Seelert | 408/83.5 |
| 1,954,241 A | * | 4/1934 | Hellyer | 408/83.5 |
| 2,026,821 A | * | 1/1936 | Cleveland et al. | 408/83.5 |
| 2,334,845 A | * | 11/1943 | Schwartz | 408/224 |
| 2,560,382 A | * | 7/1951 | Barr | 408/97 |
| 2,949,798 A | * | 8/1960 | Berta, Jr. | 408/115 R |
| 2,964,115 A | * | 12/1960 | Clatfelter | 175/40 |
| 3,522,758 A | * | 8/1970 | Italo et al. | 408/83.5 |
| 3,869,803 A | * | 3/1975 | Vaughan | 33/611 |
| 3,977,805 A | * | 8/1976 | Wanous | 408/115 B |
| 4,041,834 A | | 8/1977 | Herkes et al. | |
| 4,545,104 A | | 10/1985 | Hattan | |
| 4,684,299 A | * | 8/1987 | Laliberte | 408/115 R |
| 4,802,805 A | | 2/1989 | Hattan | |
| 4,850,756 A | * | 7/1989 | Dubois | 408/72 R |
| 4,948,318 A | | 8/1990 | Nottelmann et al. | |
| 5,018,912 A | * | 5/1991 | Reitz | 408/115 R |
| 5,743,684 A | * | 4/1998 | Rex | 408/115 R |
| 5,795,121 A | | 8/1998 | Tucker et al. | |
| 6,042,315 A | | 3/2000 | Miller et al. | |
| 6,045,310 A | | 4/2000 | Miller et al. | |
| 6,168,362 B1 | | 1/2001 | Tucker et al. | |
| 6,811,033 B1 | | 11/2004 | Owen | |

(Continued)

FOREIGN PATENT DOCUMENTS
DE  1140047 B  11/1962

*Primary Examiner* — Daniel Howell
*Assistant Examiner* — Paul M Janeski
(74) *Attorney, Agent, or Firm* — Bracewell & Giuliani LLP

(57) ABSTRACT

A system for removing failed fasteners from structures removes the head of the fastener in a controlled manner with precise support and alignment for the cutting tool. A drill guide, drill bushings and the cutting tool mount virtually anywhere on an underlying structure using existing fasteners and receptacles formed in the structure. This design permits the drill guide to be rigidly attached to the structure so that the cutting tool can be positioned and supported directly over the failed fastener. After the drill guide is mounted, a drill bit is extended through the drill bushing to drill a pilot hole in the failed fastener. The cutting tool is used through the drill bushing to cut off the head of the failed fastener without contacting the surrounding structure. All operations required to remove the failed fastener are accomplished through the drill bushings contained in the mounted drill guide.

16 Claims, 4 Drawing Sheets

U.S. PATENT DOCUMENTS

| | | |
|---|---|---|
| 6,910,252 B2 | 6/2005 | Draggie et al. |
| 2003/0056622 A1 | 3/2003 | Jordan |
| 2004/0047711 A1 | 3/2004 | Cuva et al. |
| 2004/0172793 A1 | 9/2004 | Gallant |
| 2004/0237725 A1 * | 12/2004 | Kozak ............................ 81/53.2 |
| 2004/0261232 A1 | 12/2004 | Kurtz, Jr. et al. |
| 2005/0044684 A1 | 3/2005 | Haines, Jr. |
| 2005/0101930 A1 | 5/2005 | Tachauer et al. |
| 2005/0150331 A1 | 7/2005 | Horobec |
| 2005/0201845 A1 | 9/2005 | Keener |
| 2005/0204542 A1 | 9/2005 | Pittman |
| 2005/0216027 A1 | 9/2005 | Suh et al. |

\* cited by examiner

SYSTEM, METHOD AND APPARATUS FOR REMOVING FAILED FASTENERS

BACKGROUND OF THE INVENTION

1. Technical Field

The present invention relates in general to mechanical fasteners and, in particular, to an improved system, method, and apparatus for removing failed fasteners from structures that are fabricated from composite materials.

2. Description of the Related Art

Some structures, such as the wing skins of high performance aircraft, are formed from composite materials rather than from metals or metal alloys. Composite materials offer a number of advantages over metals, such as a very high strength to weight ratio. Composite materials also have some disadvantages, including lower hardness and durability compared to metallic materials. Because of these disadvantages, composite materials are not suitable for use as all structural components. For example, metallic fasteners (e.g., bolts, screws, etc.) are required to join some structural elements.

Unfortunately, even metallic fasteners are capable of failing due to improper installation or extended service over time. There is a conventional procedure for removing a failed fastener from composite materials. This approach requires a technician to hand-drill a pilot hole in the failed fastener, and then remove the fastener with a conventional tool that is commonly referred to as an "EZ-Out."

This conventional removal procedure does not always work. When this method fails, the technician must drill out the failed fastener at an even deeper level until the head of the fastener breaks off from the threaded portion of the bolt. Where and how the head breaks off from its shank is very unpredictable. Such fastener breakage often leaves sharp burrs on the fastener shank that must be pulled through the composite materials. The sharp burrs cause damage to the inner surfaces of the hole that the fastener was in. The damaged hole must then be repaired or re-worked to accept an oversized fastener at considerable additional cost.

Currently, this process requires technicians with the highest level of skill available. All of the foregoing drilling and repair operations are performed "free hand" with little or no radial support or rigid guidance for the precise control and alignment of the cutting tools used. Such operations may be relegated to the mechanics on the shop floor using whatever tools and/or methods they are comfortable with. As a result, there is a high level of variation in the success and quality of the operations performed. Thus, an improved system, method, and apparatus for removing failed fasteners from structures would be desirable.

SUMMARY OF THE INVENTION

Embodiments of a system, method, and apparatus for removing failed fasteners from structures are disclosed. The invention removes failed fasteners by removing the head of the fastener, rather than relying on the head to break off, in a controlled manner that offers precise support and alignment for the cutting tools used by a technician. The invention is particularly well suited for applications involving structures that are fabricated from composite materials.

In one embodiment, the invention comprises a drill guide, interchangeable drill bushings and a cutting tool. The drill guide is designed to mount virtually anywhere on an underlying structure using existing fasteners and receptacles formed in the structure. This design permits the drill guide to be rigidly attached to the structure so that the cutting tool can be positioned and supported directly over the failed fastener. After the drill guide is mounted, cobalt or other suitable drill bits are extended through a selected one of the drill bushings to drill a pilot hole in the failed fastener. After the pilot hole is formed at the appropriate diameter and depth, the cutting tool is used through the drill bushing to cut off the head of the failed fastener without contacting the surrounding composite materials. Advantageously, the mounted drill guide does not have to be re-positioned as all operations required to remove the failed fastener are accomplished through the drill bushings contained in the drill guide.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-8, embodiments of a system, method, and apparatus for removing failed fasteners from structures are disclosed. The invention is particularly well suited for removing fasteners from structural components or assemblies that are formed from composite materials.

Figure 1:
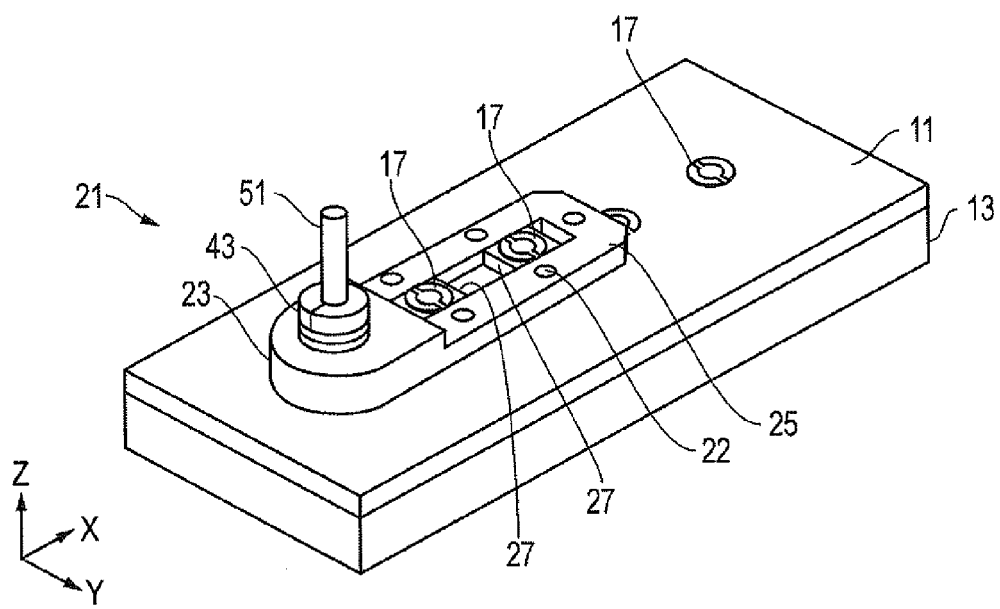
FIG. 1 is an isometric view of one embodiment of a fastener removal tool constructed in accordance with the invention, and is shown installed on a workpiece.
Figure 2:
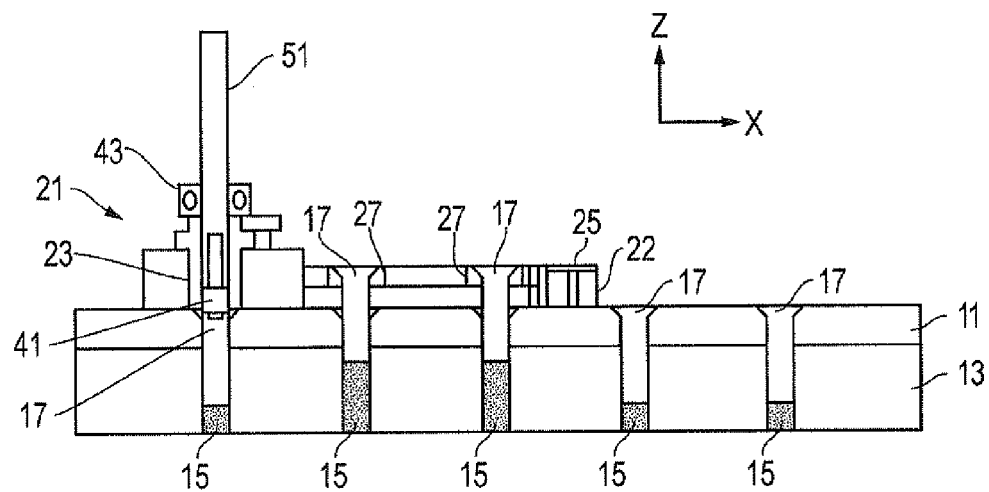
FIG. 2 is a sectional side view of one embodiment of the tool and workpiece of FIG. 1 and is constructed in accordance with the invention.

In one embodiment, the invention comprises a structure such as an assembly having two structural components 11, 13 (FIGS. 1 and 2). The structure has a plurality of holes 15 formed therein. Each hole 15 has an axis extending in a transverse or "z" direction. Conventional existing or structure fasteners 17 (e.g., screws, bolts, etc.) are mounted in respective ones of the holes 15 for securing the assembly of structural components 11, 13.

A guide 21 is positioned on the structure. The guide 21 has a body 22 that generally extends in a longitudinal or "x" direction. The guide 21 is mountable directly to the structure with at least one of the structure fasteners 17 (e.g., two are shown securing guide 21 to the structure). The guide 21 has a width that extends in a lateral or "y" direction.

Figure 5:
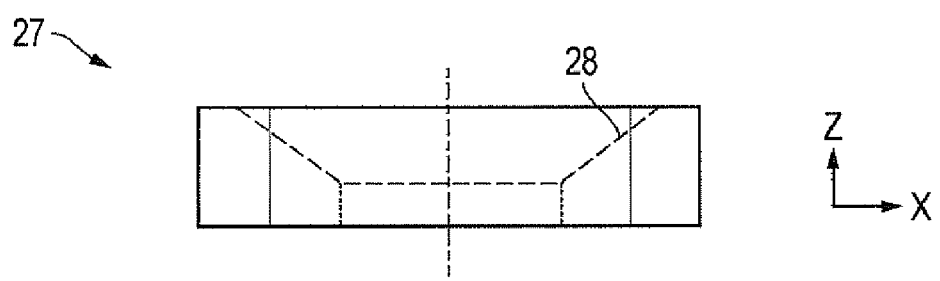
FIG. 5 is a sectional side view of one embodiment of a sliding washer for mounting the tool of FIG. 3 and is constructed in accordance with the invention.
Figure 6:
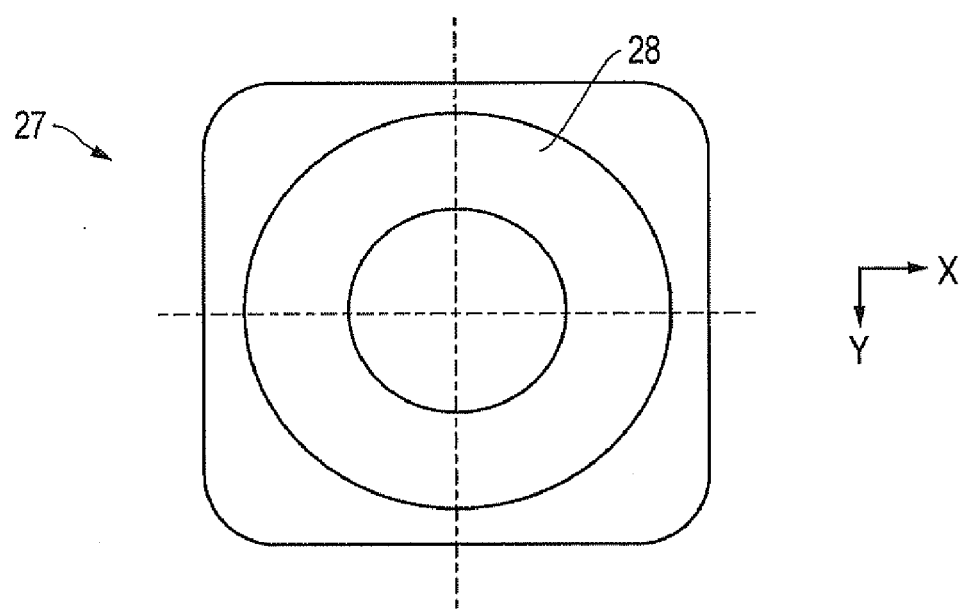
FIG. 6 is a top view of one embodiment of the sliding washer of FIG. 5 and is constructed in accordance with the invention.

A plate 25 is mounted to the body 22 with fasteners and also extends in the x direction. The plate 25 secures one or more sliding washers 27 (e.g., two shown in FIGS. 3 and 4) in a slot 29 formed between the body 22 and plate 25. Detailed views of the sliding washers 27 are shown in FIGS. 5 and 6.

Figure 4:
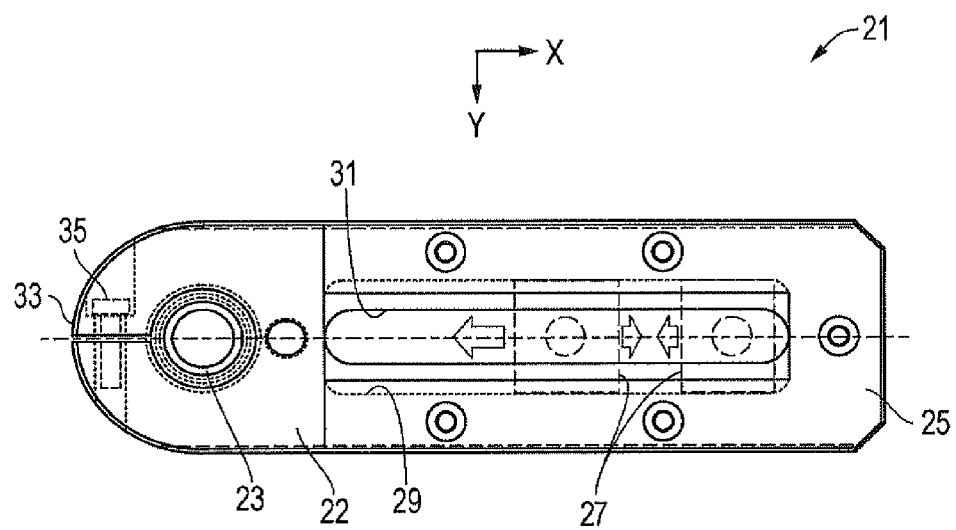
FIG. 4 is a top view of one embodiment of the tool of FIG. 3 and is constructed in accordance with the invention.

As shown in FIG. 4, the plate 25 is provided with an oval aperture 31 extending in the x-direction and through which access to the sliding washers 27 is provided. The structure fasteners 17 extend through one or more of the sliding washers 27 to secure the guide 21 to the structure.

The sliding washers 27 are slidably mounted and captured within the slot 29, which has a width extending in the y-direction in the guide 21. The sliding washers 27 are movable in the x-direction relative to the guide 21. As shown in the drawings, at least two sliding washers 27 may be provided in one embodiment, and each sliding washer 27 is countersunk 28 (FIGS. 5 and 6) for the structure fasteners 17.

Figure 3:
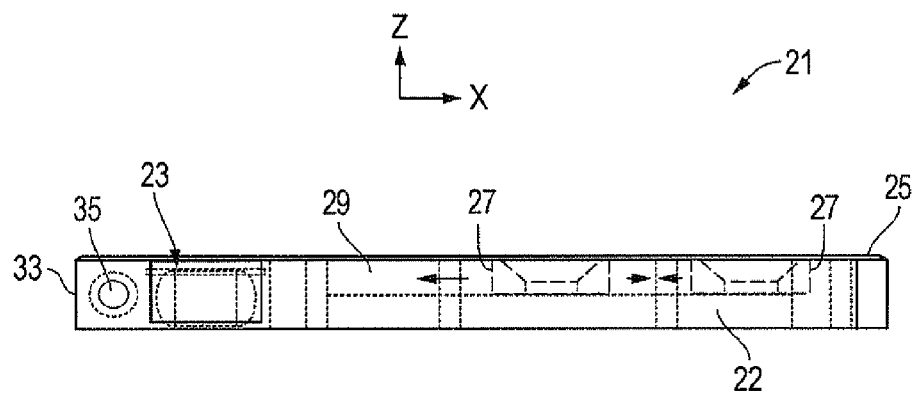
FIG. 3 is an exploded side view of one embodiment of the tool of FIG. 1 and is constructed in accordance with the invention.
Figure 8:
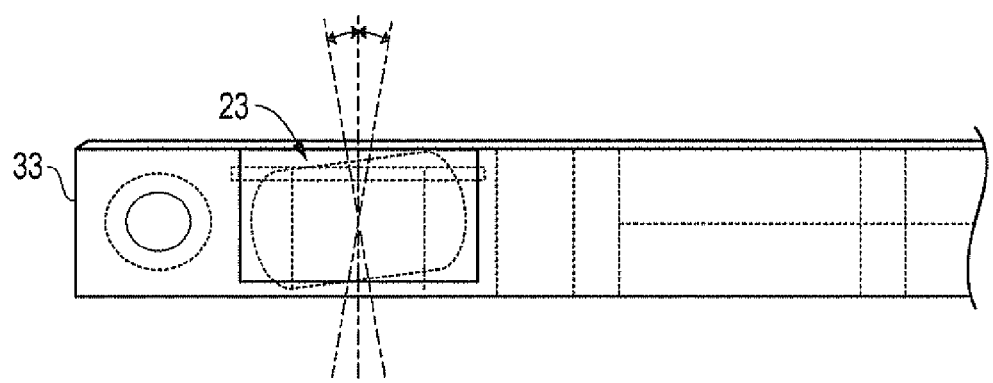
FIG. 8 is an enlarged sectional view of one embodiment of a drill bushing portion of the tool of FIG. 3 demonstrating a range of swivel motion of the drill bushing.

Referring now to FIGS. 2-4, a master bushing 23 is movably mounted to or in the guide 21. In one embodiment, the master bushing 23 is swivel-mounted in the guide 21 and is retained in the guide 21 by snap rings. The master bushing 23 is located in an aperture having a spherical inner surface. The master bushing 23 has a spherical outer surface that is closely received by the aperture. As shown in FIG. 8, this design gives the master bushing 23 a rotational range of freedom on the order of 15° to 17° relative to the guide 21. Slip fit renewable (SFR) bushings, sized appropriately for the selected cutting tool, are then utilized through the master bushing 23 to provide accurate alignment of the cutting tool.

In one embodiment, the cutting tools may be provided with a stop 43 (FIGS. 1 and 2) for limiting transverse travel of a cutting tool 41 (FIGS. 2 and 7) relative to the guide 21. The cutting tool 41 is located in and extends through the master bushing 23 for cutting a selected one of the structure fasteners 17 for removal from the structure 11. The cutting tool 41 may comprise a drill bit with a piloted countersink 45 (e.g., formed on the order of 40 degrees to vertical) that is dependent on a diameter of the structure fasteners 17.

The guide 21 also has means for locking a motion of the master bushing 23 relative to the guide. In one embodiment, the means for locking comprises a split sleeve 33 (FIGS. 3 and 4) that is formed about the master bushing 23. A bolt or screw 35 extends laterally through the split sleeve 33 adjacent the master bushing 23 for securing the master bushing 23 in a desired orientation relative to the guide 21.

The invention certainly may comprise a stand-alone apparatus or tool that is adapted for removing fasteners from structures. In addition, the invention comprises a method of removing fasteners from structures. In one embodiment, the method accurately removes fouled fasteners from underlying structures. The guide is provided with interchangeable drill bushings to ensure proper cutting tool alignment and centrality throughout the process. For example, the invention may be provided with tools for removal of fasteners having a ⅜-inch diameter, and kits for multiple other sizes, including 3/16-inch, ¼-inch, 5/16-inch, ⅜-inch, etc. diameters.

In operation, the method may comprise mounting the guide to the structure utilizing the existing fasteners already located in the structure. Using a drill with an appropriate driver 51 (e.g., FIGS. 1 and 2) a drill bit is extended through the master bushing 23 and located at a center of (i.e., co-axially align with) the fastener 17 to be removed. After center alignment between the bit and the fastener to be removed, the body 22 of the guide 21 is positioned such that at least one of the sliding washers 27 aligns with another one of the existing structure fasteners 17. The use of more than one sliding washer 27 and existing structure fastener 17 is desirable for additional stability during the process. These other structure fastener(s) 17 are then loosened and reinstalled into their holes after being inserted through the respective sliding washer(s) 27. The drill bit must still align the fastener to be removed after the guide 21 is attached and mounted to the structure 11.

In one embodiment, a ¼-inch SFR drill bushing may be mounted in the master bushing 23. A ¼-inch ball end carbide rotary file may be used to relieve or remove the drive slots formed in the head on the fastener to be removed. This allows for an uninterrupted drill start. A slow speed (e.g., 300 to 400 rpm) hand drill motor may be used for all fastener sizes. After relieving the fastener head drive slots, the SFR drill bushing may be changed to a #30 SFR drill bushing.

Figure 7:
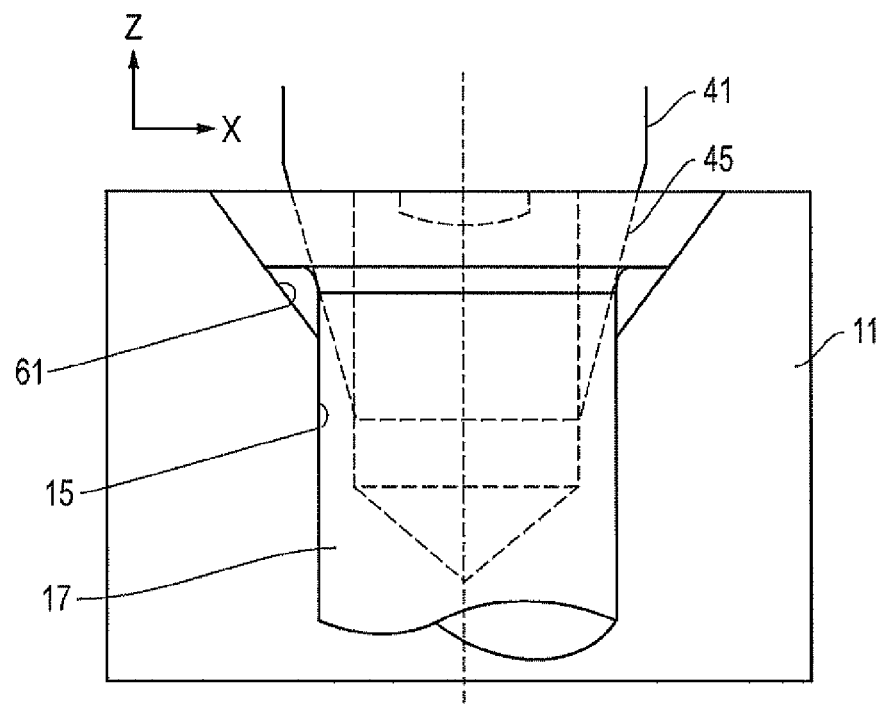
FIG. 7 is an enlarged schematic sectional side view of one embodiment of the tool of FIG. 3 being used to remove a fastener from a workpiece and is constructed in accordance with the invention.

For example, for ⅜-inch fasteners, the fastener to be removed may then be drilled to form a pilot hole therein with a #30 cobalt twist drill bit. After the #30 pilot hole is established, the SFR drill bushing may be changed to a 7/32-inch SFR drill bushing, and the fastener then drilled with a 7/32" cobalt (or other style) twist drill bit. At this stage, the technician may try using a #4 EZ-Out for removal of the fastener. In cases where the threads of the fastener are stripped, this procedure will remove the fastener. However, if the preceding step is unsuccessful, then the nut plate that secures the fastener is the problem (i.e., the nut plate spins). This will require the removal of the fastener head from its shank by cutting in order to complete the removal of the fouled fastener. The SFR drill bushing may be changed to a 5/16-inch SFR drill bushing, and the fastener drilled with a 5/16-inch cobalt twist drill bit. The 5/16" SFR drill bushing is then removed from the master bushing 23 and the head from the fastener is then removed utilizing the piloted countersink tool 41 (FIG. 7). Once the countersink tool 41 completely cuts through the fastener head, the entire fastener (i.e., fastener shank and nut plate) will push through the structure and be effectively removed. Caution should be exercised during this operation to ensure that the countersink tool 41 does not cut into the existing countersink 61 in the structure.

The invention has numerous advantages over conventional failed fastener removal techniques. For example, the invention provides a controlled method of removing failed fasteners by cutting off the fastener head without leaving a burr on the fastener parts, or potentially damaging the underlying composite materials. This system allows for accurate, rigid location and support of cutting tools used in the removal of failed fasteners. This invention aids the technicians performing the removal, and also reduces the associated risks by cutting off the fastener head instead of relying on the head to break off.

The invention provides a well-defined and repeatable removal process that allows suspect fasteners to be removed from composite materials without requiring expensive and time consuming rework of the composite material. The removal system mounts over the suspect fastener and provides a set of guides and bushings that allow a pilot hole to be made in the suspect fastener to an appropriate and repeatable diameter and depth. When necessary, a specialized cutting tool is applied using the same set of guides and bushings to remove the head without damaging the composite material.

This method does not leave a burr or otherwise damage the composite material in which the fastener was installed.

While the invention has been shown or described in only some of its forms, it should be apparent to those skilled in the art that it is not so limited, but is susceptible to various changes without departing from the scope of the invention.

What is claimed is:

1. A system for removing failed fasteners, comprising:
   a structure having a plurality of holes formed therein, each hole having an axis extending in a transverse z-direction;
   structure fasteners mounted in respective ones of the holes;
   a guide positioned on the structure, the guide being mountable directly to the structure with at least one of the structure fasteners;
   a sliding washer that, is slidably mounted and captured within a slot, has a width in a lateral y-direction in the guide, is movable in a longitudinal direction that is perpendicular to the y-direction and the z-direction, and through which a structure fastener extends;
   a master bushing mounted to the guide; and
   a cutting tool located in and extending through the master bushing for cutting a selected one of the structure fasteners for removal from the structure.

2. A system according to claim 1, wherein the master bushing is swivel-mounted in the guide.

3. A system according to claim 1, wherein the master bushing has a spherical outer surface and has a rotational range of freedom on the order of 15° to 17° relative to the guide.

4. A system according to claim 1, wherein the cutting tool has a stop for limiting a transverse travel of the cutting tool relative to the guide.

5. A system according to claim 1, wherein the cutting tool comprises a drill bit with a piloted countersink that is dependent on a diameter of the structure fasteners.

6. A system according to claim 1, wherein the sliding washer comprises at least two sliding washers, and each sliding washer is countersunk for the structure fasteners.

7. A system according to claim 1, wherein the guide comprises a body extending in a longitudinal x-direction, a plate mounted to the body for securing the sliding washer in the slot, and means for locking a motion of the master bushing relative to the guide.

8. A system according to claim 7, wherein the means for locking comprises a split sleeve formed about the master bushing and a screw extending laterally through the split sleeve adjacent the master bushing for securing the master bushing in a desired orientation relative to the guide.

9. An apparatus for removing fasteners from a structure, the fasteners extending in a transverse z-direction, comprising:
   a guide adapted to be mounted directly to the structure with fasteners in the structure, the guide extending in a longitudinal x-direction;
   a sliding washer located in the guide and adapted to support one of the fasteners, the sliding washer being movable in the x-direction; and
   a master bushing movably mounted in the guide.

10. An apparatus according to claim 9, wherein the master bushing is swivel-mounted in the guide.

11. An apparatus according to claim 9, wherein the master bushing is retained in the guide by snap rings and has a spherical outer surface and has a rotational range of freedom on the order of 15° to 17° relative to the guide.

12. An apparatus according to claim 9, further comprising slip fit renewable drill bushings extending through the master bushing and adapted to align a cutting tool.

13. An apparatus according to claim 9, wherein the sliding washer is slidably mounted and captured within a slot having a width in a lateral y-direction in the guide.

14. An apparatus according to claim 13, wherein the sliding washer comprises at least two sliding washers, and each sliding washer is countersunk to accommodate the structure fasteners.

15. An apparatus according to claim 13, wherein the guide comprises a body, a plate mounted to the body for securing the sliding washer in the slot, and means for locking a motion of the master bushing relative to the guide.

16. An apparatus according to claim 15, wherein the means for locking comprises a split sleeve formed about the master bushing and a screw extending laterally through the split sleeve adjacent the master bushing for securing the master bushing in a desired orientation relative to the guide.

* * * * *